Aug. 16, 1949.  D. E. TESSENDORF ET AL  2,479,278
FLEXIBLE COUPLING
Filed May 23, 1945  3 Sheets-Sheet 1
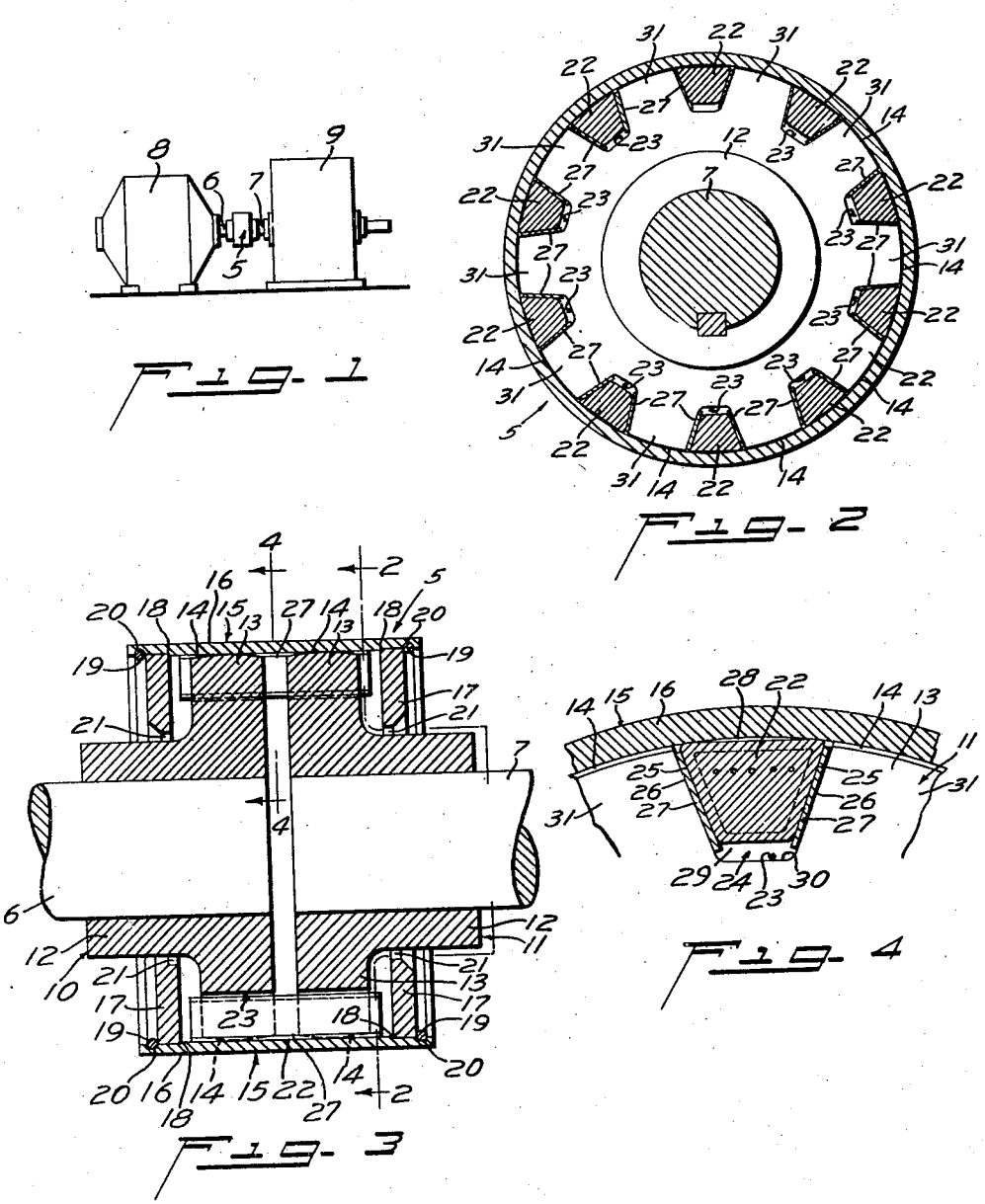
DRAPER E. TESSENDORF
CLARENCE J. HAHN
INVENTORS
BY
ATTORNEY

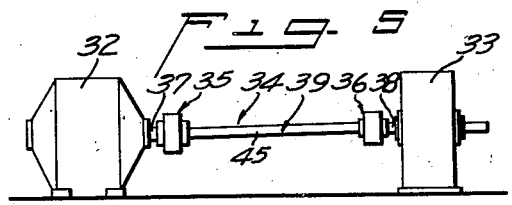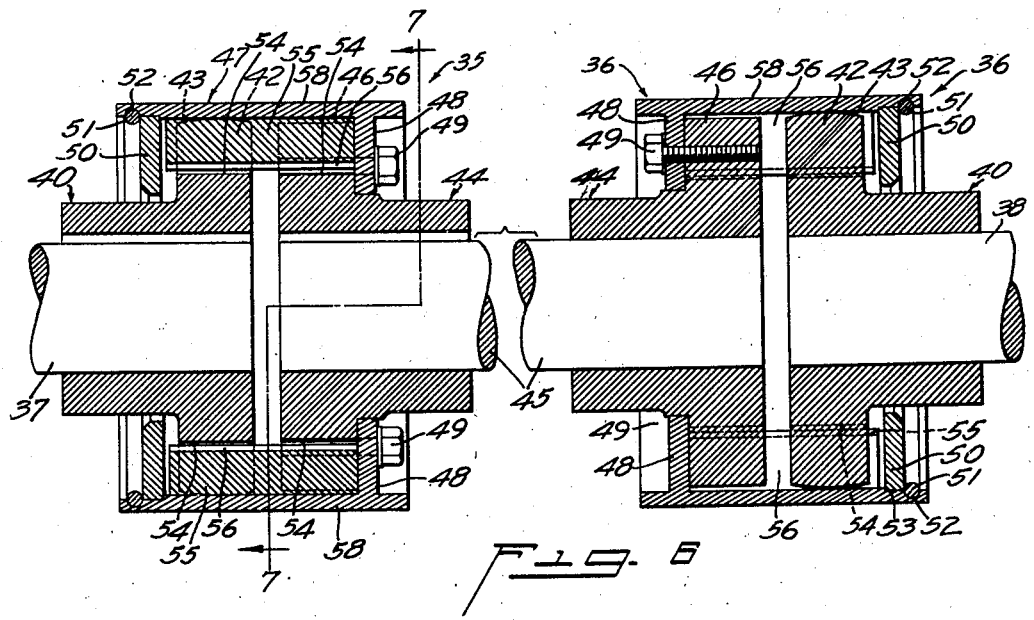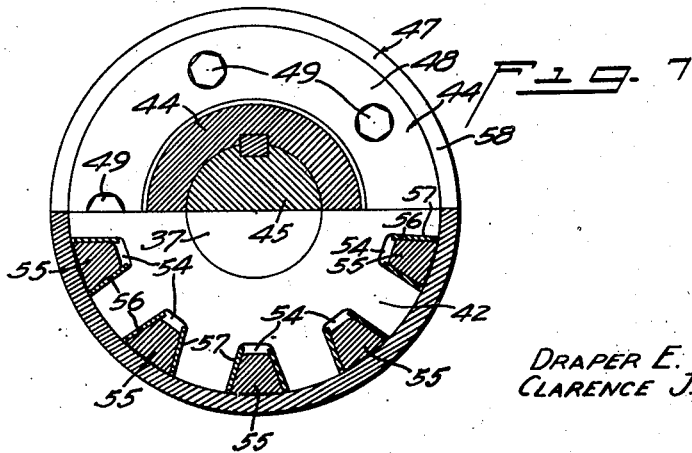
Draper E. Tessendorf
Clarence J. Hahn
INVENTOR
BY
ATTORNEY

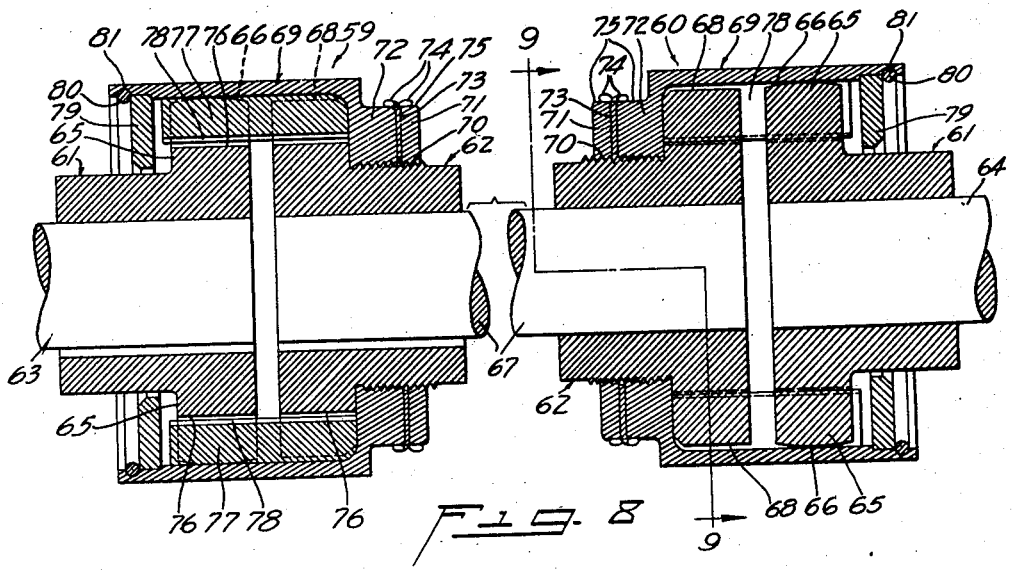
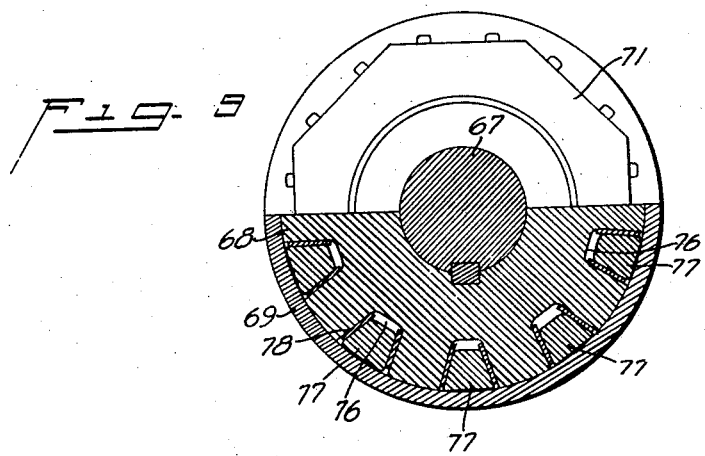

Patented Aug. 16, 1949

2,479,278

UNITED STATES PATENT OFFICE 2,479,278

FLEXIBLE COUPLING

Draper E. Tessendorf and Clarence J. Hahn, Buffalo, N. Y., assignors to Worthington Pump and Machinery Corporation, Harrison, N. J., a corporation of Delaware Application May 23, 1945, Serial No. 595,465

4 Claims. (Cl. 64—11)

The present invention relates to power transmitting devices, and more particularly to a flexible coupling.

An object of the present invention is to provide a flexible coupling for connecting the adjacent ends of coactive shafts, such as a driving shaft and a driven shaft, wherein novel means are incorporated for absorbing shocks and vibrations, and in which the construction is such as to permit angular, axial, as well as limited radial displacement of the shafts with respect to each other.

With these and other objects in view, as may appear from the accompanying specification, the invention consists of various features of construction and combination of parts, which will be first described in connection with the accompanying drawings, showing a flexible coupling of a preferred form embodying the invention, and the features forming the invention will be specifically pointed out in the claims.

In the drawings:

Figure 1 is a view of the flexible coupling in association with a driving shaft and a driven shaft.

Figure 2 is a sectional view taken along the line 2—2 of Figure 3.

Figure 3 is a longitudinal sectional view of the coupling.

Figure 4 is a sectional view along the line 4—4 of Figure 3.

Figure 5 is a view similar to Figure 1 but illustrating two flexible couplings incorporated therein.

Figure 6 is a longitudinal sectional view of two flexible coupling units embodying different details of construction.

Figure 7 is a sectional view taken along the line 7—7 of Figure 6.

Figure 8 is a view similar to Figure 6 but illustrating flexible coupling units embodying changes in construction details.

Figure 9 is a sectional view taken along the line 9—9 of Figure 8.

Referring more particularly to the drawings, Figure 1 illustrates a flexible coupling 5 interposed between the adjacent ends of a drive shaft 6 and a driven shaft 7 for drivingly connecting the two shafts, the shaft 6, for example, being operated by a motor 8 and the shaft 7 comprising a driven element of a speed reducer 9.

The flexible coupling 5 comprises two connecting bodies 10 and 11 which are fixedly connected with the adjacent ends of the shafts 6 and 7, respectively, each of which bodies includes a hub 12 and an integral annular flange 13 arranged concentrically of its respective shaft. Each of the flanges 13 is provided with a convex face 14 extending 360° about the perimeter of the flange and struck on a radius having the axial line of its respective shaft 6 or 7 as its center. The faces 14 are of the same outside diameter.

Both flanges 13 are enclosed in a housing or retainer 15, which housing comprises a tubular section 16 and end walls 17. The end walls 17 are inserted in the ends of the tubular section 16 to lie flatwise against annular shoulders 18 in the tubular section. Annular springs 19 bear against the outer faces of the walls 16 and are snapped into grooves 20 in the tubular section 16 to hold the end walls in place. The end walls 17 are of washer-like contour, with central openings 21 therein of such diameters as to freely receive their respective hubs 12 which project some distance beyond the end walls exteriorly of the housing.

While the faces 14 lie close to or bear against the inner face of the tubular section 16, the convex or spherical contours of the faces, together with the openings 21, permit the bodies 10 and 11 to turn or twist relatively to the housing 15 to permit angular displacement of the shafts 6 and 7 with respect to each other or the housing 15. At the same time, the total axial length of the two flanges 13 is less than the distance between the end walls 17, with the flanges 13 and the adjacent ends of the shafts 6 and 7 spaced one from the other, respectively, so that the two shafts may shift axially relatively to each other or the housing 15, in addition to permitting angular displacement of the shafts. Relative radial displacement of the shafts 6 and 7 is also permitted, since the housing 15 is free to rock on the faces 14.

Means for connecting the coupling members 10 and 11 so that power may be transmitted from one shaft to the other comprises a series of flexible and resilient elements 22. These elements extend longitudinally of the tubular section 16 adjacent its inner face and are spaced one from the other circumferentially of the flanges 13. The elements 22 may comprise V-belt sections cut to lengths slightly shorter than the distance between the end walls 17. Grooves 23 of the same contour as the elements 22 are provided in the flanges 13, and the elements 22 are lodged in the grooves to drivingly connect the two shafts. While the grooves 23 open through the faces 14 on the flanges 13, the tubular section 16 covers the grooves and co-acts therewith to provide openings 24 of generally trapezoidal contour for retaining the elements 22 and restraining the latter from radial displacement as an incident to rotation of the coupling.

Between the side faces 25 of the elements 22 and the side faces 26 of the grooves 23 are inserted thin and flexible metal straps 27, which straps may be of the same length as the normal length of the elements 22. As will be noted in Figure 4, the grooves 23 are deeper than the thickness of the elements 22 but the latter are of such width as normally to cause slight crowding of the elements against the straps 27 and the tubular section 16, with a slight normal space 28 between the elements and the tubular section 16 and a greater normal space 29 between the elements and the bottom faces 30 of the grooves 23. Because of the grooves 23, the peripheral margins of the flanges 13 are divided into a plurality of radial fingers or pressure elements 31, the circumferential spacing of which is such as to define the grooves 23 within which the elements 22 are lodged. While the elements 22 fit snugly against the straps 27 and the tubular section 16, the faces 26 of the fingers or pressure elements 31 on the flanges 13 may slide relatively to the straps 27 to accommodate angular or axial displacement of the shafts 6 and 7 with respect to each other.

The straps 27 provide wearing protection for the elements 22, in addition to spreading and distributing the torsional load throughout the full length of the elements when the latter are placed in compression in response to the load effective on the coupling, although the spacing between the flanges 13 places the elements and the straps in shear. Because of the axial spacing between the flanges 13, both the straps 27 and the elements 22 are caused to flex slightly out of their straight-line contours, which lend additional desirable flexible qualities to the coupling. However, the spacing between the flanges 13 is such as not to cause excessive bending of the straps 27 and the elements 22, so that both the straps and the elements retain sufficient stiffness to transmit full loads without damage to the parts, but at the same time yielding in a sufficient degree to aid the resilient properties of the elements in effectively damping torsional vibration.

It will thus be seen that the coupling construction is such as to effectively accommodate angular displacement of the shafts 6 and 7, in addition to embodying flexible and resilient properties which effectively dampen vibrations. At the same time, the straps 27 cradle the elements 22 and afford good wearing protection therefor, and the flanges 13 may shift freely relatively to the straps to accommodate any axial and radial displacement which might be present, in addition to any shifting made necessary by the angular displacement of the drive and driven shafts. The coupling is of relatively simple and durable construction, and the parts thereof may easily be assembled or taken apart for repair. Furthermore, the V-belt sections 22 are so arranged as to taper radially toward the axes of the respective flanges 13 so that the sections are easily lodged in the grooves 23, and the sections are removable with practically no effort upon removal of the tubular section 16.

Figure 5 illustrates an operating condition wherein the motor 32 is spaced a considerable distance from the speed reducer 33 or other type of driven machine. In the arrangement shown, the operating connection 34 includes two flexible coupling units 35 and 36 which are connected with the drive shaft 37 of the motor 32 and the driven shaft 38 of the speed reducer 33, respectively, and the units 35 and 36 are in turn connected one with the other by a shaft or spool member 39. The shafts 37 and 38 are offset laterally in Figure 5 but with parallel axes, as an example, since different operating conditions might cause a different relationship between the drive shaft and the driven shaft, as when they lie at an angle to each other.

Referring to Figure 6, the units 35 and 36 each includes a connecting body 40. The body 40 of the unit 35 is fixedly connected with the drive shaft 37, and the body 40 of the unit 36 is fixedly connected with the driven shaft 38. Both bodies 40 are identical with the bodies 10 and 11, so that each includes an annular flange 42 which is provided with a convex face 43 extending 360° about the perimeter of the flange and struck on a radius having the axial line of its respective shaft 37 or 38 as its center.

Each of the units 35 and 36 also includes a second connecting body 44 which is fixedly connected with a shaft 45 of the spool member 39. While the units 35 and 36 are identical in structural detail, the units are reversed in an endwise sense so that the one shaft 45 may be fixedly connected with the two connecting bodies 44. Both connecting bodies 44 are provided with flanges 46.

The flanges 42 and 46 are arranged concentrically of the axes of their respective shafts, and the two flanges in each of the units 35 and 36 are enclosed in a housing or retainer 47. Each retainer includes an annular flange 48 which is spaced a short distance inwardly of one end of the retainer and against which the associated flange 46 is fixedly secured, as by bolts 49. The flanges 42 are spaced from their associated flanges 46 in the same manner as the flanges 13, the chief difference residing in the fact that the retainers 47 are each fixedly connected with one of the enclosed flanges. Thus the shaft 45, the two connecting bodies 44, and the associated retainers 47 define the spool member 39.

An end wall 50 is provided for each retainer 47 adjacent the enclosed flange 42, which end wall is held in place by a spring 51 which is snapped into a groove 52 for holding the end wall against an abutting shoulder 53 formed on the retainer.

In Figures 6 and 7, the flanges 42 and 46 are provided with grooves 54 which are identical with the grooves 23 for accommodating flexible and resilient elements 55, the latter comprising sections of V-belt. Thin and flexible metal straps 56 are also interposed between the side face of the elements 55 and the wall faces 57 of the grooves 54, and both the straps and the flexible elements are held in the grooves 54 by the retainer wall 58.

Figures 8 and 9 illustrate a different form of construction wherein two flexible coupling units 59 and 60 are employed for transmitting rotary motion from a driver to the machine connected therewith. In Figure 8, the units 59 and 60 are of like construction, each including a connecting body 61 and a connecting body 62. The connecting body 61 of the unit 59 is fixedly connected with the drive shaft 63, while the body 61 of the unit 60 is fixedly connected with the driven shaft 64. The connecting bodies 61 are identical with the bodies 40, so that the flange 65 of each body is provided with a convex face 66 which extends 360° about the perimeter of the flange and is struck on a radius having the axial line of its respective shaft 63 or 64 as its center.

The bodies 62 are similar to the bodies 44 and are fixedly connected with a shaft 67. The bodies 62 have flanges 68 which are spaced short distances axially from their respective flanges 65, and each pair of flanges 65 and 68 is enclosed within a housing or retainer 69. The bodies 62 are fixedly related to the respective retainers 69, as by the threaded connections 70. Lock nuts 71 are threaded upon the bodies 62 for restraining the retainer 69 from accidental rotation. Between the lock nuts 71 and the retainer walls 72 are interposed lock washers 73, the latter having ears 74 which are bent down on the flat faces 75 of the lock nuts 71 and the end walls 72 to key the lock nuts to the end walls.

The flanges 65 and 68 are provided with grooves 76 which are identical with the grooves 23 for the reception of flexible and resilient elements 77, the latter comprising sections of V-belt. Flexible metal strips 78 are also interposed between the side walls of the elements 77 and the walls of the grooves 76. Since the retainers 69 extend about the grouped flanges 65 and 68, the elements 77 are held firmly in the grooves 76. End walls 79 are associated with the retainers 69 and are held therein by springs 80 which are snapped into grooves 81 in the retainers.

The forms of construction shown in Figures 5 through 7 and 8 and 9 operate in the same manner as the form illustrated in Figures 1 through 4, at least so far as angular, axial, and radial displacement of the drive and driven shafts are concerned. In the form of Figures 1 through 4, both flanges enclosed within the one retainer are loosely related thereto, while the forms shown in Figures 6 and 8 embody a construction wherein one flange in each retainer is fixedly connected with that retainer. This arrangement provides a more efficient construction in cases where the motor and the driven machine are spaced considerable distances one from the other. A loose connection such as that shown in Figure 3 is objectionable when employed in pairs in a single operating connection because of the whipping characteristics of the dual arrangement. Such whipping is entirely eliminated in coupling devices such as those illustrated in Figures 6 and 8.

The V-belt sections 22, 55, and 77 are durable and capable of long and hard use in flexible couplings of the types shown. Since a considerable number of the total V-belts manufactured are defective and therefore represents a loss and increases cost of production, the present invention is ideally suitable for utilizing the good portions of defective belts, thereby providing a market for belts which otherwise represents a loss to the belt manufacturer. A V-belt which is defective throughout only a small distance of its total length is entirely unsuitable for belt purposes. Short of major defects throughout the entire length of the belts, it is a relatively easy matter to cut the flexible elements or sticks 22, 55, and 77 from the good portions of the belt.

Obviously, the magnitude of the torque to be transmitted through the couplings will determine the size and number of the flexible elements 22, 55, and 77, the diameters of the couplings as a whole, as well as the radial distances of the elements from the axes of the couplings.

It will be understood that the invention is not to be limited to the specific construction or arrangement of parts shown, but that they may be widely modified within the invention defined by the claims.

What is claimed is:

1. In a flexible coupling, a driving coupling member and a driven coupling member; said coupling members provided with radially extending annular flanges having opposing longitudinal flexible element receiving grooves; said grooves being beveled so that the width of the grooves increases with the radial distance from the axes of said coupling members; flexible elements for transmitting torque from said driving member to said driven member slidably seated within said grooves and having wedge faces substantially parallel to the beveled faces of said grooves; and a rotatable retainer housing enclosing said flanges for restraining the outward radial movement of said flexible elements due to centrifugal force; each of said flexible elements having width such that it is seated on its wedge faces with a space between its bottom and the bottom of the groove to accomodate distortion due to axial misalignment of said coupling members; said annular flanges having convexly curved outer peripheries so as to permit tilting of said coupling members with respect to said retainer housing.

2. In a flexible coupling, a driving coupling member and a driven coupling member; said coupling members provided with radially extending annular flanges having opposing longitudinal flexible element receiving grooves; said grooves being beveled so that the width of the grooves increases with the radial distance from the axes of said coupling members; flexible elements for transmitting torque from said driving member to said driven member slidably seated within said grooves and having wedge faces substantially parallel to the beveled faces of said grooves; and a rotatable retainer housing enclosing said flanges for restraining the outward radial movement of said flexible elements due to centrifugal force; each of said flexible elements having width such that it is seated on its wedge faces with a space between its bottom and the bottom of the groove to accommodate distortion due to axial misalignment of said coupling members; one of said annular flanges having a convexly curved outer periphery so as to permit tilting of its coupling member with respect to said retainer housing.

3. In a flexible coupling, a driving coupling member and a driven coupling member; said coupling members provided with radially extending annular flanges having opposing longitudinal flexible element receiving grooves; said grooves being beveled so that the width increases with the radial distance from the axes of said coupling members; flexible elements for transmitting torque from said driving member to said driven member slidably seated within said grooves and having wedge faces substantially parallel to the beveled faces of said grooves; flexible wearing straps slidably interposed between the beveled faces of said grooves and the wedge faces of said flexible elements; and a rotatable retainer housing enclosing said flanges for restraining the outward radial movement of said flexible elements due to centrifugal force; each of said flexible elements having width such that it is seated on its wedge faces with a space between its bottom and the bottom of the groove to accommodate distortion due to axial misalignment of said coupling members; said annular flanges having convexly curved outer peripheries so as to permit tilting of said coupling members with respect to said retainer housing.

4. In a flexible coupling, a driving coupling member and a driven coupling member; said coupling member provided with radially extending annular flanges having opposing longitudinal flexible element receiving grooves; said grooves being beveled so that the width of the grooves increases with the radial distance from the axes of said coupling members; flexible elements for transmitting torque from said driving member to said driving member slidably seated within said grooves and having wedge faces substantially parallel to the beveled faces of said grooves; flexible wearing straps slidably interposed between the beveled faces of said grooves and the wedge faces of said flexible elements; and a rotatable retainer housing enclosing said flanges for restraining the outward radial movement of said flexible elements due to centrifugal force; each of said flexible elements having width such that it is seated on its wedge faces with a space between its bottom and the bottom of the groove to accommodate distortion due to axial misalignment of said coupling members; one of said annular flanges having a convexly curved outer periphery so as to permit tilting of its coupling member with respect to said retainer housing.

DRAPER E. TESSENDORF.
CLARENCE J. HAHN.

REFERENCES CITED

The following references are of record in the file of this patent:

UNITED STATES PATENTS

| Number | Name | Date |
| --- | --- | --- |
| 1,194,662 | Rathburn | Aug. 15, 1916 |
| 1,587,403 | Nicholson | June 1, 1926 |
| 1,812,141 | Dobbins | June 30, 1931 |
| 1,834,521 | Froussard | Dec. 1, 1931 |
| 1,935,730 | Smith | Nov. 21, 1933 |
| 2,027,842 | Schmitter et al. | Jan. 14, 1936 |
| 2,154,077 | Sampson | Apr. 11, 1939 |

FOREIGN PATENTS

| Number | Country | Date |
| --- | --- | --- |
| 839,967 | France | 1939 |